United States Patent Office 3,539,959
Patented Nov. 10, 1970

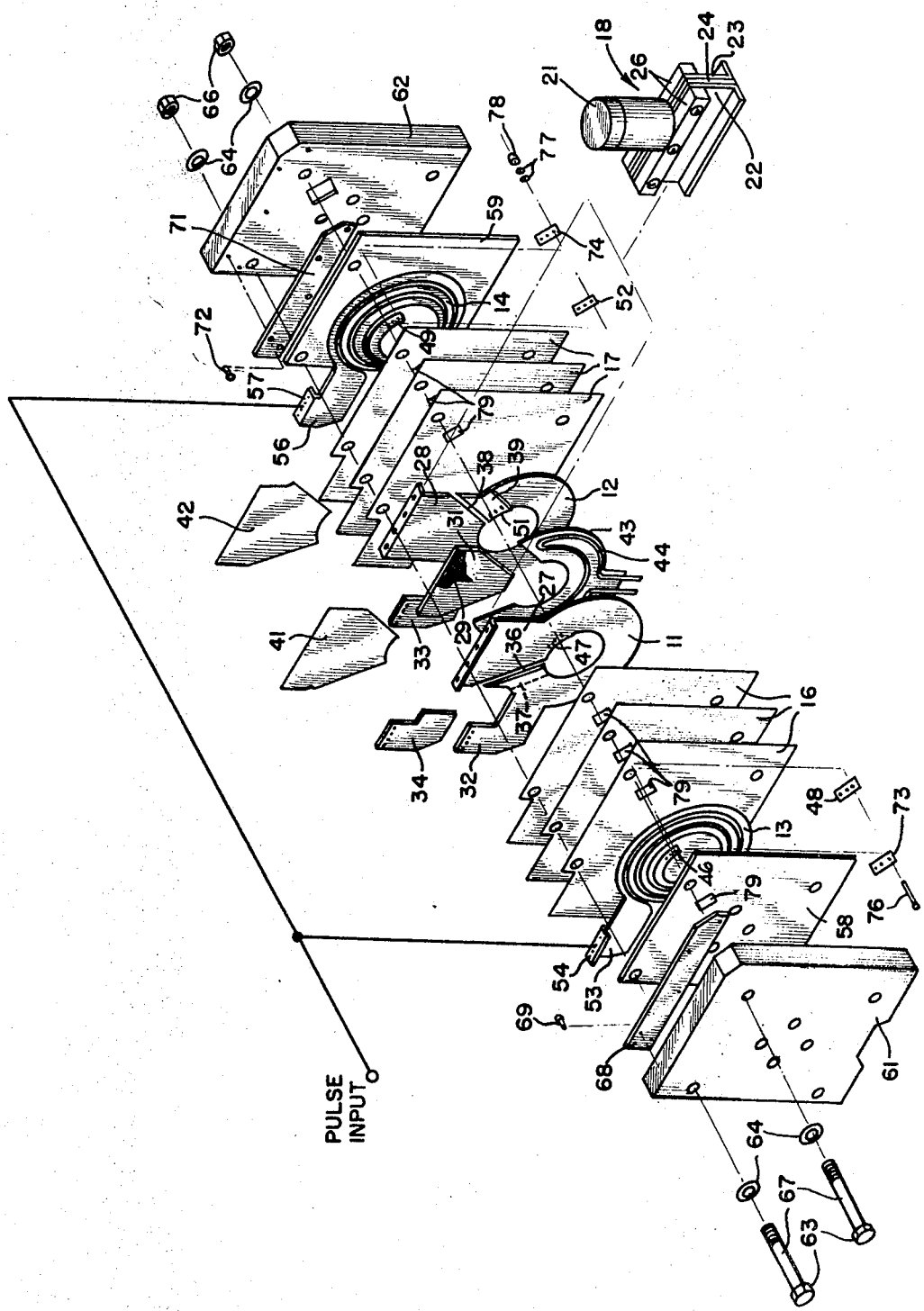

3,539,959
TRANSFORMER HAVING SANDWICHED COILS AND COOLING MEANS
Paul Wildi, San Diego, Calif., assignor to Gulf General Atomic Incorporated, San Diego, Calif., a corporation of Delaware
Filed May 17, 1968, Ser. No. 730,052
Int. Cl. H01f 27/08, 27/30
U.S. Cl. 336—60                     1 Claim

ABSTRACT OF THE DISCLOSURE

A transformer is described including two pairs of windings of substantially flat configuration positioned to be inductively coupled and secured together with suitable insulation in a sandwich assembly.

---

This invention relates to transformers and, more particularly, to an improved transformer capable of handling high energy pulses, for example, pulses of 50,000 amperes or more at 5 to 10 kv.

For certain applications, it may be desirable to provide a transformer which is capable of handling very high energy pulses. One such applicatiton is in connection with magnetic forming equipment, such as is shown and described in U.S. Pat. No. 2,976,907. Magnetic forming equipment utilizes a bank of storage capacitors which provide an electrical current pulse of high ampereage which is passed through a conductive forming coil, thereby producing a pulsed magnetic field of high intensity. The magnetic field induces a current in a conductive workpiece positioned in the pulsed magnetic field. This induced current, in turn, interacts with the magnetic field to produce a force acting on the workpiece. If the force is sufficiently strong, a deformation of the workpiece results. The shape of the deformation is dependent upon the shape of the magnetic field and the position of the workpiece relative to the field. Repeated pulses of current may be applied to the conductive forming coil, thus causing a series of deforming impulses to be applied to the workpiece.

For certain shapes of parts to be formed, by magnetic forming equipment, it may be desirable to utilize a forming coil requiring a relatively small voltage and a comparatively large current. For practical reasons, however, commercial magnetic forming machines are typically built for a relatively large voltage, for example, 8.3 kv. and the storage capacitor bank typically incorporates capacitances that are in multiples of, for example, 360 $\mu$f. Thus, for certain sizes of forming coils, the capacitor bank of the magnetic forming machine and the forming coil may be poorly matched in their impedances. A coupling transformer for providing a better impedance match may therefore be employed and such should be capable of handling the high current pulses present.

A number of difficulties are encountered in designing transformers capable of handling very high currents, such as may be employed in connection with magnetic forming apparatus as above described. High current levels produce high forces within the coil assembly which may tend to cause relative movement between parts thereof. Such movement may cause excessive wear of electrical insulation in critical places. High current operation also tends to produce extreme heat which may cause failure of structural elements in the coil assembly or failure of insulation therein. Voltages necessary to produce the desired power levels may cause large differences in potential between various parts of the transformer assembly. This increases the danger of electrical flashover or breakdown across electrical insulation at various points in the transformer. There may be certain physical size limitations on the transformer in order to keep it within the bounds of a practical size unit. Finally, although care is taken in construction of the transformer, parts naturally tend to wear out or, possibly, to break down. Replacing the entire transformer is costly and it is therefore desirable to be able to readily disassemble the transformer in order to replace or repair individual parts thereof.

It is an object of this invention to provide an improved transformer capable of carrying high current pulses.

Another object of the invention is to provide a transformer capable of handling high current pulses at relatively high rates of repetition.

Still another object of the invention is to provide a transformer capable of handling high current pulses and in which wear and/or failure of internal parts is minimized.

A further object of the invention is to provide a transformer capable of handling high current pulses and which is of minimal size.

It is another object of the invention to provide an improved high current pulse transformer which is capable of being readily disassembled for repair or replacement of parts therein.

Other objects of the invention will become apparent to those skilled in the art from the following description, taken in connection with the accompanying drawing which is an exploded perspective view, partially schematic, of a transformer constructed in accordance with the invention.

Very generally, the transformer of the invention comprises a first pair of windings 11 and 12, each having a substantially flat configuration. A second pair of windings 13 and 14 is also provided, each winding also having a substantially flat configuration. Suitable insulating means 16 and 17 are provided for maintaining electrical separation between the windings. The windings and the insulating means are positioned adjacent each other in generally mutual parallel relationship, each of the second pair of windings being disposed sufficiently close to one of the first pair of windings as to be inductively coupled thereto. The windings and the insulating means are secured together in a sandwich assembly.

Referring now more particulary to the drawing, the particular embodiment of the invention illustrated therein is a transformer for use with magnetic forming apparatus. The transformer operates to provide a proper impedance match between a forming coil 18 and a suitable capacitor bank power source, not illustrated. The power source provides high energy pulses at a pulse input terminal 19. The forming coil 18 is an expansion type coil, that is, a coil which provides a force exerted radially outward upon energization of the coil. The coil winding or windings, not illustrated, are disposed inside a cap 21 of insulating material such as polycarbonate. The winding of the forming coil may be a single turn loop of beryllium copper alloy having a stainless steel water cooling tube embedded in its surface and being encapsulated in a fiberglass or epoxy material. Using such a construction, coils may be designed for operation at rates up to 6 cycles per minute. Two conductive plates 22 and 23, connected to the hot side and the ground side of the forming coil, respectively, depend from the coil and are held against a separating insulation sheet 24 by a pair of bolted clamping bars 26. The lower edges of the plates 22 and 23 are flanged to provide for mounting the coil on the top of the transformer described below.

The windings 11 and 12 of the transformer carry the high current which is supplied to the coil 18. Each of the windings 11 and 12 is of a substantially flat configuration, each being an annular plate having appendages which will be described subsequently. The winding 11 has a plate section 27 which extends outwardly thereof and which is provided with a flange at its extremity for mounting to the flange on the plate 22 of the coil. Similarly, the winding 12 has a plate section 28 which extends outwardly therefrom and which is provided with a flange at its outer extremity for mounting to the flange on the plate 23 of the coil 18. The two plate sections 27 and 28 are relatively wide parallel plates, minimizing leakage inductance on the secondary side of the transformer. To further minimize leakage inductance, a copper plate 29 covered with an outer sheath of insulation 31 is positioned between the plate sections 27 and 28. The copper plate is electrically floating with respect to the potentials on the plate sections 27 and 28.

A further pair of appendages or plate sections 32 and 33 extend outwardly from the windings 11 and 12, respectively. Each of the plate sections 32 and 33 is of generally L-shaped configuration and joins the remaining portion of the winding with which it is associated at a position about 90° around the winding from the plate sections 27 and 28, respectively. The plate sections 32 and 33 are parallel with each other and are electrically joined by a copper plate 34 of appropriate thickness. The assembly of the plates 32, 33 and 34 is electrically connected by suitable means to ground.

The winding 11 is provided with a slot 36 therein which extends completely across the annular plate portion of the winding and electrically separates the plate section 27 from the plate section 32. A plate 37 of copper or other suitable conductive material is secured to the flat surface of the winding 11 adjacent the slit 36 on the side thereof toward the plate section 32. The plate 37 is on the same side of the winding 11 as the plate 34 and is of approximately the same thickness, extending all the way to contact the facing surface of the winding 12 between the plate sections 28 and 33 thereof.

The winding 12 is provided with a slit 38 adjacent the plate section 28 and on the opposite side thereof from the plate section 33. A plate 39 similar to the plate 37 is secured to the surface of the winding 12 facing the winding 11 and is positioned adjacent the slit 38 on the side thereof opposite the plate section 28. The plate 39 is of a thickness about equal to the thicknesses of the plate 34 and of the plate 37 and extends all the way to the facing surface of the winding 11. The result of the foregoing arrangement is that the plate sections 33 and 28 on the winding 12 are at near ground potential, whereas the plate 39 is near the greater potential of the plate section 27 on the winding 11. The plate 37 on the winding 11 and the plate section 32 thereof are near ground potential, whereas the plate section 27 of the winding 11 is at the greater potential. Thus, the potential difference across the plate sections 27 and 28 is applied across the plates 22 and 23 of the coil assembly 18. The windings 11 and 12 are electrically in parallel.

The thickness of the plates 34, 37 and 39 are sufficient to space the windings 11 and 12 from each other a distance which allows for accommodation of the copper insert, its insulation cover, two additional sheets of insulation 41 and 42 spaced on opposite sides of the copper insert 29, and a heat sink 43. The heat sink 43 is comprised of a suitable heat conductive material such as copper having a coolant passage 44 therein through which a suitable coolant, such as water, may be circulated to remove heat from the transformer during repeated pulsing. Alternatively, a thicker secondary winding may be utilized having coolant passages drilled therein.

The illustrated transformer is an autotransformer, although it is to be understood that the invention is not limited to an autotransformer and that other types of transformer designs may be utilized. The particular design illustrated, however, provides an efficient use of material, good electrical efficiency, and enables the grounding of one point in the secondary circuit. The primary windings 13 and 14 are of substantially flat configurations and include three turns each. In the autotransformer construction, the secondary windings 11 and 12 constitute the fourth turns of the primary windings, respectively, as is well known in the art. The innermost termination 46 of the spiral primary winding 13 is connected to a region 47 near the plate section 27 of the secondary winding 11 by means of a conductive plate 48 of suitable thickness. Similarly, the innermost termination 49 of the spiral primary winding 14 is electrically connected to the region 51 of the secondary winding 12 by means of a conductive plate 52 of suitable thickness. The opposite end of the spiral winding 13 from the terminus 46 is provided with a plate section 53 extending outwardly therefrom and having a suitable connection flange 54. A similar plate section 56 with connecting flange 57 extends from the end of the spiral winding 14 opposite the termination 49. Both flanges 54 and 57 are electrically connected, as indicated schematically, to the pulse input terminal 19.

The insulation 16 between the windings 11 and 13 in the illustrated embodiment comprises three sheets of a suitable material such as polyester foil. The insulation 17 positioned between the windings 12 and 14 comprises three sheets of a similar material. A sheet 58 of an insulating material, such as neoprene rubber, is positioned adjacent the winding 13 on the opposite side thereof from the insulation 16. Similarly, a sheet 59 of an insulating material, such as neoprene rubber, is positioned adjacent the winding 14 on the opposite side thereof from the insulation 17.

A pair of press plates 61 and 62 form the outside elements of the sandwich assembly of the transformer. The press plates 61 and 62 are secured together by bolts 63 which pass through suitable aligned openings in the press plates and the insulation, being secured by washers 64 and nuts 66. The bolts 63 are provided with sleeves 67 of a suitable insulation, such as polyolefin. A bolt cover plate 68 is secured by screws 69 to the inner surface of the press plate 61 and is of a thickness approximately equal to the combined thicknesses of the winding 13 and the sheet 58. A similar bolt cover plate 71 is secured by screws 72 to the inner surface of the press plate 62. The thickness of the plate 71 is approximately equal to the combined thicknesses of the winding 14 and the sheet 59. The regions 46 and 49 are clamped against each other by a pair of clamping plates 73 and 74 and bolts 76, washers 77 and nuts 78. Not all the various bolts, washers, and nuts have been shown in the previously described connections, to prevent overcomplication of the drawing. Suitable rectangular openings 79 are provided in the various sheets of insulation for accommodating the rectangular plates 73 and 74, and the plates 48 and 52.

Electrically, the illustrated transformer comprises a pair of parallel connected autotransformers having both their primary and secondary windings connected in parallel with each other. Thus, the primary windings, including the windings 13 and 11 and the windings 14 and 12, are connected in parallel with each other between the pulse input terminal 19 and ground. Moreover, the winding 13 is connected in parallel with the winding 14 through the plates 48 and 52. The secondary windings of the parallel autotransformers comprise the windings 11 and 12 which are connected in parallel with each other between the plate 22 of the coil 18 and ground, to which the plate 23 of the coil 18 is also connected through the plate section 28 of the coil 12.

The bolt construction makes the sandwich assembly capable of being readily disassembled for repair or replacement of the various parts thereof. The thin insulating layers enable close inductive coupling between the coils. The bolt construction enables the sandwich assembly to be prestressed and prevent any movement as a result of the high forces present during high current pulsing. Removal of heat is directly from the primary source of heat produced in the transformer. This reduces the chance of failure of various structural elements of the transformer and mitigates against breakdown of the various insulation layers therein due to excessive temperatures. The flat configuration of the coil is capable of carrying higher current or lower current density for greater power and/or less chance of failure due to lower thermal stresses. Because the windings are substantially flat and are held relatively close to each other with a substantial surface area presented thereto, good heat transfer from the windings to the heat sink results, and close magnetic coupling for minimal magnetic losses also results.

It may therefore be seen that the invention provides an improved transformer having a high momentary current capability. The transformer is capable of withstanding considerable high forces and has a small leakage inductance and a small magnetizing current requirement. Means for cooling are readily provided to enable the transformer to be utilized at a high pulse repetition rate. The particular illustrated embodiment of the invention, utilizing an autotransformer design, makes it possible to avoid crossing of leads in the transformer connections.

Various modifications of the invention in addition to those shown and described herein will becomes apparent to those skilled in the art from the foregoing description and accompanying drawings. Such modifications are intended to fall within the scope of the appended claim.

What is claimed is:

1. A transformer comprising, a pair of first windings each having a substantially flat configuration, said first windings being juxtaposed in substantially mutually parallel physical relation, first insuating means ellectrically insulating said first windings from each other, cooling means disposed between said first windings for removing heat therefrom, a pair of second windings each having a substantially flat configuration, said second windings being positioned, respectively, on opposite sides of said juxtaposed first windings in parallel physical relation thereto, second insulating means for maintaining electrical separation between said pair of first windings and said pair of second windings, each of said second windings being disposed sufficiently close to a respective one of said first windings as to be inductively coupled thereto, each of said first windings comprising an annular plate, each having a plate section extending outwardly thereof and comprising an electrical terminal, each of said annular plates having a slit therethrough adjacent said plate section thereof, said windings being positioned such that said plate sections are aligned and said slits are not aligned, a pair of conductive blocks adjacent said slits, respectively, joining said first windings to be electrically in parallel, a pair of press plates, said press plates being positioned, respectively, on opposite sides of said pair of second windings, and means for mechanically securing said press plates together to clamp said first and second windings, said cooling means, said conductive blocks, and said first and second insulating means together in a sandwich assembly.

References Cited

UNITED STATES PATENTS

| | | | |
|---|---|---|---|
| 1,742,985 | 1/1930 | Burnham | 336—183 XR |
| 2,874,360 | 2/1959 | Eisler | 336—200 |
| 2,937,350 | 5/1960 | Sasaki | 336—232 XR |
| 3,001,162 | 9/1961 | Riley | 336—183 XR |
| 3,002,260 | 10/1961 | Shortt et al. | 336—200 XR |
| 3,277,416 | 10/1966 | Barr | 336—84 |
| 3,419,834 | 12/1968 | McKechnie et al. | 336—232 XR |
| 3,271,716 | 9/1966 | Furth | 336—233 XR |

THOMAS J. KOZMA, Primary Examiner

U.S. Cl. X.R.

336—84, 183, 232